United States Patent [19]
Smith et al.

[11] Patent Number: 6,138,122
[45] Date of Patent: Oct. 24, 2000

[54] MODELING OF INTERNET SERVICES

[75] Inventors: Mark D. Smith, Ft. Collins, Colo.; Deborah L. Caswell, Santa Clara; Srinivas Ramanathan, Sunnyvale, both of Calif.

[73] Assignee: Agilent Technologies, Palo Alto, Calif.

[21] Appl. No.: 09/033,040

[22] Filed: Mar. 2, 1998

[51] Int. Cl.[7] .................................................. G06F 17/30
[52] U.S. Cl. ............................... 707/103; 707/3; 707/10; 714/25
[58] Field of Search .................................. 707/103, 8, 10; 714/25

[56] References Cited

U.S. PATENT DOCUMENTS

| | | | |
|---|---|---|---|
| 5,276,877 | 1/1994 | Friedrich et al. | 395/650 |
| 5,295,244 | 3/1994 | Dev et al. | 395/161 |
| 5,553,235 | 9/1996 | Chen et al. | 395/182.18 |
| 5,581,755 | 12/1996 | Koerber et al. | 707/103 |
| 5,604,892 | 2/1997 | Nuttall et al. | 395/500.39 |
| 5,608,786 | 3/1997 | Gordon | 379/100 |
| 5,644,764 | 7/1997 | Johnson et al. | 707/103 |
| 5,710,885 | 1/1998 | Bondi | 395/200.54 |
| 5,732,261 | 3/1998 | Savittzky et al. | 707/103 |
| 5,758,348 | 5/1998 | Neubauer | 707/103 |
| 5,826,265 | 10/1998 | Huben et al. | 707/8 |
| 5,878,431 | 3/1999 | Potterveld et al. | 707/103 |
| 5,893,107 | 4/1999 | Chan et al. | 707/103 |
| 5,918,232 | 6/1999 | Pouschine et al. | 707/103 |

OTHER PUBLICATIONS

Syllogic White Paper: "Adaptive Systems Management", Version 2.1, Jan. 1998, pp. 1–14, Copyright 1997–1998 by Syllogic B. V.

*Primary Examiner*—Hosain T. Alam
*Assistant Examiner*—Jean M. Coriélus
*Attorney, Agent, or Firm*—Alexander J. Neudeck

[57] ABSTRACT

The dependancies of a computer service are modeled. The modeling hierarchically defines the relationships between the computer service and the hardware and software services which the computer service depends. These relationships may be contained in data structures defining a directed acyclic graph. The model also defines which measurements need to be taken to determine health and performance of the computer service and the health and performance of all the computer services upon which the computer service depends. Software agents that take these measurements may be deployed using the model to determine the measurement locations and functions. Data from measurement agents may be propagated up the model hierarchy. The model may also be visualized by a graphical interface to communicate the dependancies and the health and status of the services upon which the modeled service depends.

6 Claims, 2 Drawing Sheets

MODELING OF INTERNET SERVICES

FIELD OF THE INVENTION

The present invention relates generally to detecting and diagnosing problems with computer services. More specifically, the present invention relates to the autonomous collection, organization, distillation, and presentation of measurement data from computer services to enable operators to detect, isolate, and resolve faults and quality of service problems, as well as conduct service and capacity planning.

BACKGROUND OF THE INVENTION

The worldwide network of computers commonly known as the "Internet" has seen explosive growth in the last several years. Mainly, this growth has been fueled by the introduction and widespread use of so-called "web" browsers, which allow for simple graphical user interface (GUI)-based access to network services such as E-mail, news, file transfer protocol (ftp), web pages, etc. Many people contract with an internet service provider (ISP) to obtain access to the Internet. Subscribers to an ISP typically use a personal computer and modem to connect to the ISP using the public switched telephone network. Once connected, the user may perform the desired functions.

In addition to providing a connection to the Internet, ISPs or other computer access providers (CAPs), such as corporate IT departments, often provide additional services that expand, enhance, or improve internet functions. For example, many CAPs provide users with the ability to send and receive E-mail. Or, the CAP may provide a local domain name server (DNS) to speed the resolution of the domain names the subscriber is trying to access, thereby improving overall access speed.

The customers of these services tend to view the quality of that service in simple terms: accessibility and performance (i.e. speed, responsiveness, etc.) Unfortunately, the accessibility and performance of a service may depend on many factors. First, there is the service itself and the servers that implement the service. These servers may be comprised of the server software, the hardware running the server software, the operating system running on the hardware, and the network hardware and software that support the implementation of that service. Finally, the performance and accessibility of the server components may further depend on other services, hardware, software, etc. For example, the quality of E-mail service may first depend on the hardware and software running the E-mail program. This E-mail program may depend on a DNS server and a network router. The DNS may be used to resolve domain names before the E-mail can be sent, and the router may be used to relay the E-mail from the CAP's local network to the Internet backbone. Finally, the performance of the DNS server may depend on the performance of a network file system (NFS) server and several other pieces of hardware, software, or services provided by the same, or different hardware and software. Each of the components that contribute to the performance of the E-mail service are interrelated and may be located on the same or different networks or hardware, rely on the same or different software and operating systems, or be running on the same, or different, hardware.

It can be seen from the previous discussion that the simple quality of service measures of accessibility and performance may depend on the interrelationships of many hardware and software components arranged in a complex system infrastructure. It is also likely that individual CAPs will have an infrastructure comprised of a unique arrangement of components and their interrelationships. This makes it difficult to construct a "one size fits all" solution to conduct service and capacity planning and to detect, isolate, and resolve faults and quality of service problems.

Many CAPs manage their networks and services on a rather ad hoc basis. Collections of management scripts available in the public domain and policies and procedures developed on the fly combine to provide what little proactive measurement and monitoring of the infrastructure there is. Detailed knowledge of the infrastructure, relationships, test and measurement techniques, policies and procedures are often passed around the CAPs staff by word of mouth. Relationships between all the infrastructural components are usually only understood by the most senior technical operations staff. Finally, changes in operational procedures and policies are usually initiated only after hard won experience in dealing with failures and quality of service problems have been internalized by the operations staff. This period of internalization with its associated failures and poor service can adversely affect a CAPs reputation, and cost a CAP customers, market share, and revenue.

Accordingly, there is a need in the art for a system that captures the knowledge and experience of the senior technical operations staff and make that information available to a much wider audience. Such a system should to be able to gather data from a variety sources and tools that test infrastructure elements, collect data from SNMP MIBs and log files and correlate that data into the information needed to enable less skilled member of the operations staff to detect, isolate, and resolve faults and quality of service problems. There is a need in the art for a system that includes the detection of potential problems before they create a failure, are detected by users, or result in a quality of service problem. There is a need in the art for a system that allows less skilled members of the operations staff to diagnose, isolate, and resolve failures and quality of service problems without consulting the senior technical operations staff. Finally, it would be desirable if such a system could configure itself automatically and deploy the tools and test elements necessary for problem detection, isolation, and resolution.

SUMMARY OF THE INVENTION

These and other needs are satisfied by the methods and apparatus of the present invention for modeling, displaying, and gathering information relating to computer services. Working from configuration information, a hierarchical model of a computer service is constructed. This model is an explicit model of a computer based service. The model defines the structure and dependencies of a service and its components, the measurements, baselines and thresholds, the health status, alarms, and control of the service components. The model enables: easier fault detection and isolation, auto deployment and configuration of the system, dissemination of expertise, root cause analysis, and visualization of the structure and dependencies of a service and its components.

In one embodiment, this model may be represented as an acyclic graph. At the root of the model is the service itself. The next level is the servers that implement the service itself. Each of these servers is in turn are comprised of the server software, operating system, network interfaces, other services, etc. that support the implementation of that service. Further elements of the infrastructure are tied into the model at each level of the hierarchy. Finally, at the leaf nodes of this service model are the actual measurements that monitor fundamental aspects of the health and performance of each of the infrastructure components represented higher up in the hierarchy. The hierarchical model establishes how each service depends upon other services, software, hardware, and networks. A component of a service may have its own model. The model of this component may be instantiated in the model of the service. These models, and the functions they help achieve, may be implemented by data structures and programs running on one or more computer systems.

A representation of the hierarchical model provides an easy to understand method of viewing the complex relationships of infrastructure elements and the measurements that indicate the health of each modeled infrastructure element. This representation may be displayed using a graphical user interface (GUI). Measurements, as well as an indication of the health of each infrastructure may be displayed on the representation of the model.

The hierarchical model also provides a template for automatically deploying software agents to take measurements of the fundamental aspects that affect the health and performance of the service. These measurements are propagated back up the hierarchical model to provide an indication of the overall health and performance of the service. Individual measurements may be detected and deemed abnormal as defined by deviations from baselines and/or threshold values. Abnormalities due to the cumulative effects of several dependant infrastructure elements may also be detected by propagating measurement information up the model hierarchy and then applying an arithmetic, or alternatively, a fuzzy-logic test. When abnormalities are detected, the model may also contain control definitions. These control definitions may define what actions to take to resolve the abnormality.

Problems with computer services may be diagnosed using the dependancies established by the hierarchical model by descending the hierarchy of the problem service. As the model is traversed from the problem service to lower levels of the hierarchy, it is examined for other services that are having problems. Healthy elements, and the services they depend on, are quickly eliminated. Root cause determination is facilitated by narrowing the search to only a few elements. This search may be conducted automatically, or with the aid of a GUI displaying a representation of the model, indications of the health of each infrastructure component, and measurement data.

DETAILED DESCRIPTION OF THE PREFERRED EMBODIMENTS

Figure 1:
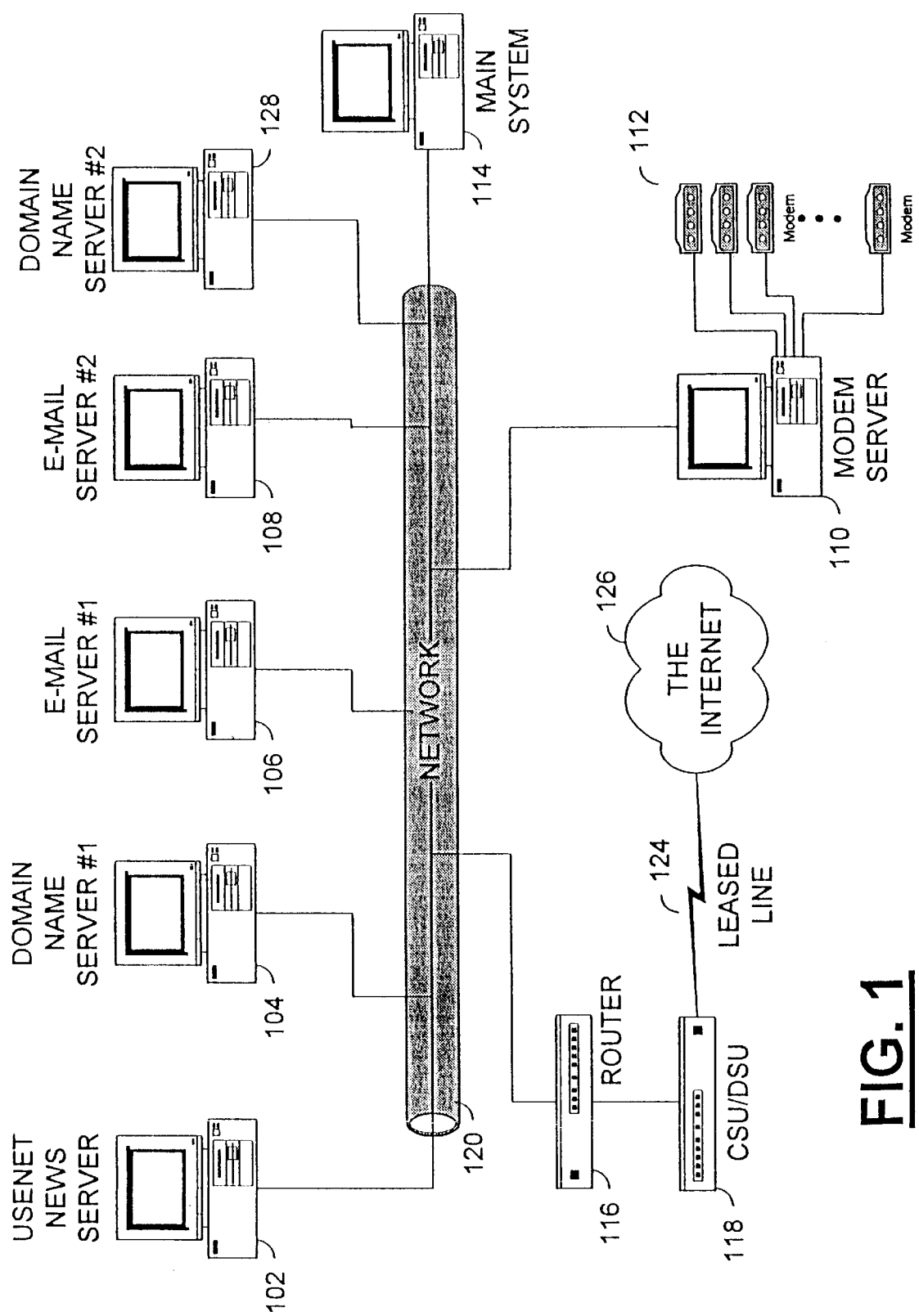
FIG. 1 is a schematic illustration of a representative CAP.

FIG. 1 shows a schematic illustration of a computer access provider (CAP). Users connect via the telephone network to one of the modems 112 that are connected to a modem server 110. Modem server 110 connects to at least one local area network 120. This network 120 allows communication between other computers (102, 104, 106, 108, 128, and 114) within the CAP that are also connected to the network 120. The network is also connected, via some means, to the Internet 126. In this representative diagram, that connection is shown as being via a router 116, a CSU/DSU 118, and a leased line 124.

Services may be provided by software running on computers (102, 104, 106, 108, 110, 128, and 114) connected to network 120. In FIG. 1, E-mail is provided by processes running on computers 106 and 108. The CAP of FIG. 1 is configured so that requests for E-mail services are divided between computers 106 and 108. Domain name service (DNS) is provided by processes running on computers 104 and 128. USENET news service is provided by processes running on computer 102. Finally, computer 114 is used to provide overall administration.

Figure 2:
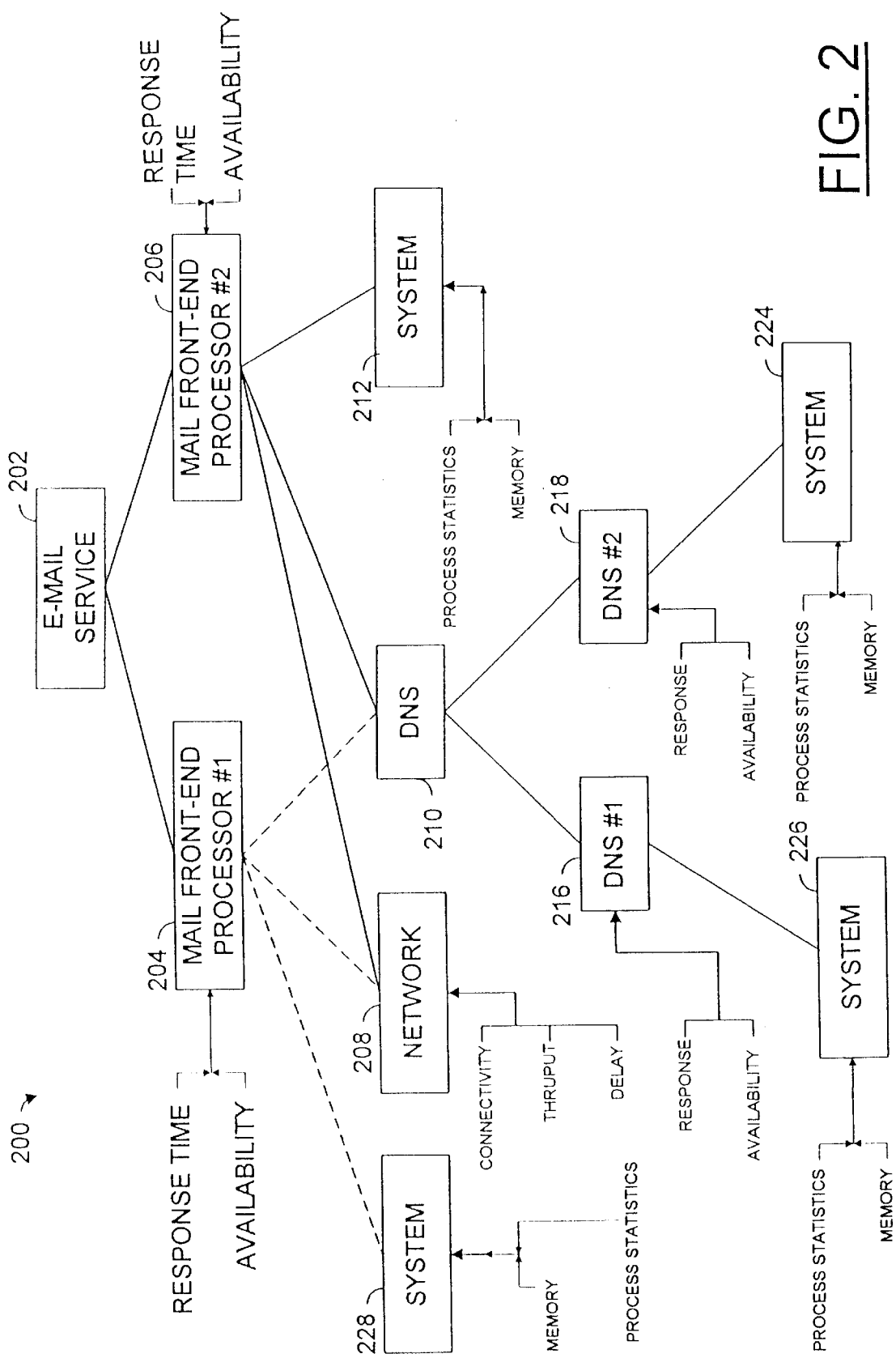
FIG. 2 is a schematic illustration of part of a hierarchical model of an E-mail service of FIG. 1.

FIG. 2 illustrates a hierarchical model 200 of a E-mail service of the representative CAP of FIG. 1. At the root of the model 200 is the E-mail service represented by box 202. As discussed above, the E-mail service of the CAP of FIG. 1 depends upon two E-mail front-end processes running on two separate computers 106, 108. These processes form the next level of the hierarchy and are represented as boxes 204 and 206. The dependancy of the E-mail system on these two front-end processors is shown by the solid lines running from box 202 to boxes 204 and 206. The measurements that are indicative of the performance of these processes are response time and availability. These leaf nodes of the model are shown as arrows feeding into boxes 204 and 206.

The performance of E-mail front end processor #2 as represented by box 206 depends on the performance of: the network, the DNS, and computer system 108. These are represented, in order, by boxes 208, 210, and 212. The dependancy of E-mail front end processor #2 on these services is shown by the solid lines running from box 206 to boxes 208, 210, and 212. The performance of E-mail front end processor #1 as represented by box 204 depends on the same network and DNS as E-mail front end processor #2, but a different computer system. These dependancies are shown by the dotted lines from box 204 to boxes 208, 210, and 228. The performance of E-mail front end processor #1 depends on the performance of computer system 106 whereas the performance of E-mail front end processor #2 depends on computer system 108 so they have different connectivity in the model.

The measurements that are indicative of the performance of the computer systems represented by boxes 228 and 212 are memory and process statistics. These leaf nodes of the model are shown as arrows feeding into boxes 228 and 212, respectively. The measurements indicative of the performance of the network represented by box 208 are connectivity, thruput, and delay. Connectivity measures whether certain connections can be made, or whether certain computers may be reached, thruput measure show much data per second can be transferred across the network, and delay measures how long it takes data to get to its destination. These leaf nodes of the model are shown as arrows feeding into box 208.

The DNS service as represented by box 210 depends on the performance of two DNS processes running on two separate computers 104, 128. These processes form the next level of the hierarchy and are represented as boxes 216 and 218. The dependancy of the DNS service on these two processes is shown by the solid lines running from box 210 to boxes 216 and 218. The measurements that are indicative of the performance of these processes are response time and availability. These leaf nodes of the model are shown as arrows feeding into boxes 216 and 218, respectively.

The DNS #1 and DNS #2 processes depend on the performance of the computer systems they are running on: computer system 104 for DNS #1 and computer system 128 for DNS #2. These computer systems are represented by boxes 226 and 224, respectively. The dependancy of DNS #1 on computer system 104 is represented by the solid line running from box 216 to box 226. The dependancy of DNS #2 on computer system 128 is represented by the solid line running from box 218 to box 224. The measurements that are indicative of the performance of the computer systems represented by boxes 226 and 224 are memory and process statistics. These leaf nodes of the model are shown as arrows feeding into boxes 226 and 224, respectively.

The advantages of this modeling in deploying measurement agents can been seen by examining FIG. 2. Agents to monitor the health of the E-mail system may be deployed simply by traversing the model and starting agents, on the appropriate computer systems, to take the measurements indicated by the leaf nodes. By deploying only those agents indicated by the leaf nodes of the model, unnecessary agents are not deployed, unnecessary measurements are not taken, and the whole process can be automated using a tree-traversing algorithm. Because two or more high-level services may depend upon the same low level service, the possibility of redundant agents being deployed exists. This is not necessarily bad. However, a simple method for avoiding this, if desired, would be to mark leaf nodes as they are deployed, and then not deploy a measurement agent for marked leaf nodes.

Once the measurement agents are deployed, the model may also be used to notify the operations staff of potential problems. Take the case where computer system 128 is about to run out of memory. This would be detected by the memory measurement agent represented by the leaf node MEMORY feeding into box 224. The memory measurement agent would realize that the amount of memory used has exceeded a pre-set threshold. It would then relay this information, possibly in the form of an alarm, to a system containing the model. In FIG. 1 this would most likely be computer system 114. Computer system 114 could then look at the model and determine, by following the model dependancies up the model, that DNS #2 was about to have a problem, and that may cause overall DNS problems. It could then determine that a problem with the DNS could cause problems with both E-mail front end processors which could cause problems with the E-mail service. It could make these determinations by traversing the model from box 224 to box 218 to box 210 and then to each of boxes 204 and 206, in turn, which both lead to box 202, representing E-mail service. Therefore, using the model, it can be determined which services are going to be affected by a potential, or real, problem.

These problems, as well as all measurement data could be communicated to operations staff via a graphical display. This graphical display could illustrate the dependancies of the infrastructure components by presenting a visual representation of the model much like FIG. 2. Measurement data could be illustrated as leaf nodes feeding infrastructure components, or as bar graphs, dials, and other indicia inside the representations of individual infrastructure components. Problems, potential problems, and measurements that have exceeded thresholds could be emphasized on the display by flashing or changing the color of the representation of that service or measurement.

To construct the hierarchical model, the information for that service must first be defined. One way to do this would be via a GUI where icons are used to represent services and lines, or links, can be drawn to establish dependancies. A simpler way would be to use a text file. In the case of a text file an entry for each service is created that assigns a name to the service, chooses the type of service from a group of predefined services, and then optionally specifies the components that this service is dependent upon and also optionally measurements to be taken that are indicative of the performance of that service, and parameters necessary for those measurements. Entries that define measurements, how to take the m, and the baselines and thresholds for that measurement that indicate a problem could also be included. These entries may define, or re-define templates and threshold values. A portion of a sample file is shown in table 1.

Table 1 shows entries for the E-mail service, mail front-end processor #1, and the computer system that runs mail front-end processor #1. These services correspond to boxes 202, 204, and 228 in FIG. 2, respectively. Table 1 also contains and entry that could be used to override the default threshold for the measurement of CPU usage.

TABLE 1

| | |
|---|---|
| begin-service | |
| name = | Mail-Service |
| type = | STServiceMail |
| components = | Mail-Front-End-1, Mail-Front-End-2 |
| measurements = | Mail-Response |
| end-service | |
| begin-service | |
| name = | Mail-Front-End-1 |
| type = | STServiceMail |
| components = | Mail-Front-End-1-Host |
| measurements = | Mail-Response(localhost, testmachine.com), |
| | Mail-Availability(testmachine.com) |
| end-service | |
| begin-service | |
| name = | Mail-Front-End-1-Host |
| type = | STHost |
| measurements = | CPU-Stats(mailhost1.hp.com), |
| | MEM-Stats(mailhost1.hp.com) |
| end-service | |
| begin-measurement | |
| name = | CPU-Stats |
| script = | rsh $p1 load --percent |
| type = | gauge |
| unit = | percent |
| threshold = | 150 |
| baseline = | standard |
| end-measurement | |

The measurements field in Table 1 specifies the measurements that are to be taken to establish an indication of the health of the service. For example, the MEM-Stats measurement may run a script on the machine specified as a parameter that returns the amount of free memory on that machine. This return value would be an indication of whether more memory, or virtual memory, needs to be added to that machine.

A fairly simple parsing algorithm could be used to read the configuration information and construct a model of the service. The model could be comprised of one or more directed graphs stored in computer memory using any number of conventional data structures. The measurements could be processing running on local or remote machines, but return their data to a supervisory program that stores measurement values in the model. The supervisory, or another program, could be used to propagate alarm conditions around the model according to the dependancies specified by the model. The supervisory, or another, program could read the model for dependancy information, measurement values, alarm conditions to provide a graphical display of the status of a service and all of its infrastructure components. Programs that read the model could also be used to diagnose and isolate problems by allowing a user to traverse the model looking for problems conditions while the model continually received updates from the measurement processes.

It will be appreciated that the instant specification is set forth by way of illustration and not limitation, and that various modifications and changes may be made without departing from the spirit and scope of the invention.

What is claimed is:

1. A method of modeling and monitoring a computer service, comprising:
   (a) defining a set of services that said computer service depends upon, wherein said set of services has at least one member;
   (b) constructing a model of the relationships between the members of said set of services and said computer service, said model identifying a set of measurements for each member of said set of services that gives an indication of the performance of that service, said model including threshold values associated with said measurements;
   (c) deploying a measurement agent that takes a measurement that is a member of said set of measurements;
   (d) producing, based on said step (c), a measured performance parameter value indicative of said performance;
   (e) comparing said measured performance parameter value to one of said threshold values; and
   (f) determining which member of said set of services is causing abnormal performance of said computer service based on said model and based on said step (e).

2. The method of claim 1, further comprising:
   (g) utilizing said model to perform said step (c).

3. A method of modeling and monitoring a computer service, comprising:
   (a) defining a set of services that said computer service depends upon;
   (b) constructing a model of the relationships between the members of said set of services and said computer service, said model identifying a set of measurements for at least one member of said set of services that gives an indication of the performance of said one member;
   (c) determining that said computer service depends upon said set of services based on said model;
   (d) identifying said set of measurements for said one member based on said model and in response to said step (c);
   (e) analyzing performance of said one member in response to said step (d) and based on said set of measurements for said one member of said set of services; and
   (f) determining which member of said set of services is causing said abnormal performance of said computer service in response to said step (e).

4. The method of claim 3, wherein said step (e) further includes the step of measuring performance of said one member of said set of services in response to said step (d).

5. The method of claim 3, further comprising:
   (g) determining that said computer service is exhibiting abnormal performance; and
   (h) performing said step (c) in response to said step (g).

6. A computer system, said system programmed to perform the following steps:
   (a) receiving and storing a model of a computer service, said model defining a set of services that said computer service depends upon and identifying a set of measurements for each service of said set of services that gives an indication of the performance of that service;
   (b) analyzing said model to identify at least one service of said set of services and to identify at least one measurement of said set of measurements that gives an indication of the performance of said one service;
   (c) analyzing performance of said one service in response to said step (b) and based on said one measurement; and
   (d) determining whether said one service is causing abnormal behavior of said computer service based on said step (c).

* * * * *